United States Patent
Xu et al.

(10) Patent No.: US 8,102,594 B2
(45) Date of Patent: Jan. 24, 2012

(54) METHODS AND SYSTEMS FOR COMPENSATION OF SELF-PHASE MODULATION IN FIBER-BASED AMPLIFICATION SYSTEMS

(75) Inventors: Chunhui (Chris) Xu, Ithaca, NY (US); James W. van Howe, Davenport, IA (US); Guanghao Zhu, Ithaca, NY (US)

(73) Assignee: Cornell University, Ithaca, NY (US)

( * ) Notice: Subject to any disclaimer, the term of this patent is extended or adjusted under 35 U.S.C. 154(b) by 475 days.

(21) Appl. No.: 12/297,798

(22) PCT Filed: Apr. 27, 2007

(86) PCT No.: PCT/US2007/067636
§ 371 (c)(1),
(2), (4) Date: Jan. 7, 2009

(87) PCT Pub. No.: WO2008/094274
PCT Pub. Date: Aug. 7, 2008

(65) Prior Publication Data
US 2009/0201573 A1 Aug. 13, 2009

Related U.S. Application Data

(60) Provisional application No. 60/795,681, filed on Apr. 28, 2006.

(51) Int. Cl.
*H04B 10/17* (2006.01)
(52) U.S. Cl. ........................ 359/341.1; 372/25
(58) Field of Classification Search .................. 359/333, 359/341.1; 372/25
See application file for complete search history.

(56) References Cited

U.S. PATENT DOCUMENTS

| | | | | |
|---|---|---|---|---|
| 5,373,382 A * | 12/1994 | Pirio et al. | ..................... | 398/185 |
| 6,072,813 A * | 6/2000 | Tournois | ..................... | 372/25 |
| 6,252,693 B1* | 6/2001 | Blauvelt | ..................... | 398/194 |
| 6,915,084 B2* | 7/2005 | Ho et al. | ..................... | 398/208 |
| 7,013,089 B1* | 3/2006 | Ho et al. | ..................... | 398/159 |
| 2001/0015843 A1* | 8/2001 | Miyauchi et al. | ..................... | 359/161 |
| 2004/0042802 A1* | 3/2004 | Ho et al. | ..................... | 398/208 |
| 2004/0125435 A1* | 7/2004 | Liu et al. | ..................... | 359/337 |
| 2005/0111500 A1* | 5/2005 | Harter et al. | ..................... | 372/25 |

OTHER PUBLICATIONS

Xu et al., "Compensation of nonlinear self-phase modulation with phase modulators", Electronics Letters, vo. 38, No. 24, pp. 1578-1579 (2002).*

* cited by examiner

*Primary Examiner* — Eric Bolda
(74) *Attorney, Agent, or Firm* — Burns & Levinson, LLP; Jacob N. Erlich, Esq.; Orlando Lopez, Esq.

(57) ABSTRACT

Methods and systems for compensation of Self-Phase Modulation 35 in fiber-based amplifier systems 20.

9 Claims, 5 Drawing Sheets

UTILIZING A SIGNAL PROPORTIONAL TO OPTICAL INTENSITY OF AN OPTICAL SIGNAL AS A MODULATING SIGNAL FOR A PHASE MODULATOR
65

IMPARTING PHASE, WITH THE PHASE MODULATOR, ON THE OPTICAL SIGNAL, THE IMPARTED PHASE BEING SUFFICIENT TO SUBSTANTIALLY COMPENSATE FOR SELF PHASE MODULATION IN A FIBER-BASED AMPLIFIER
70

FIG. 2

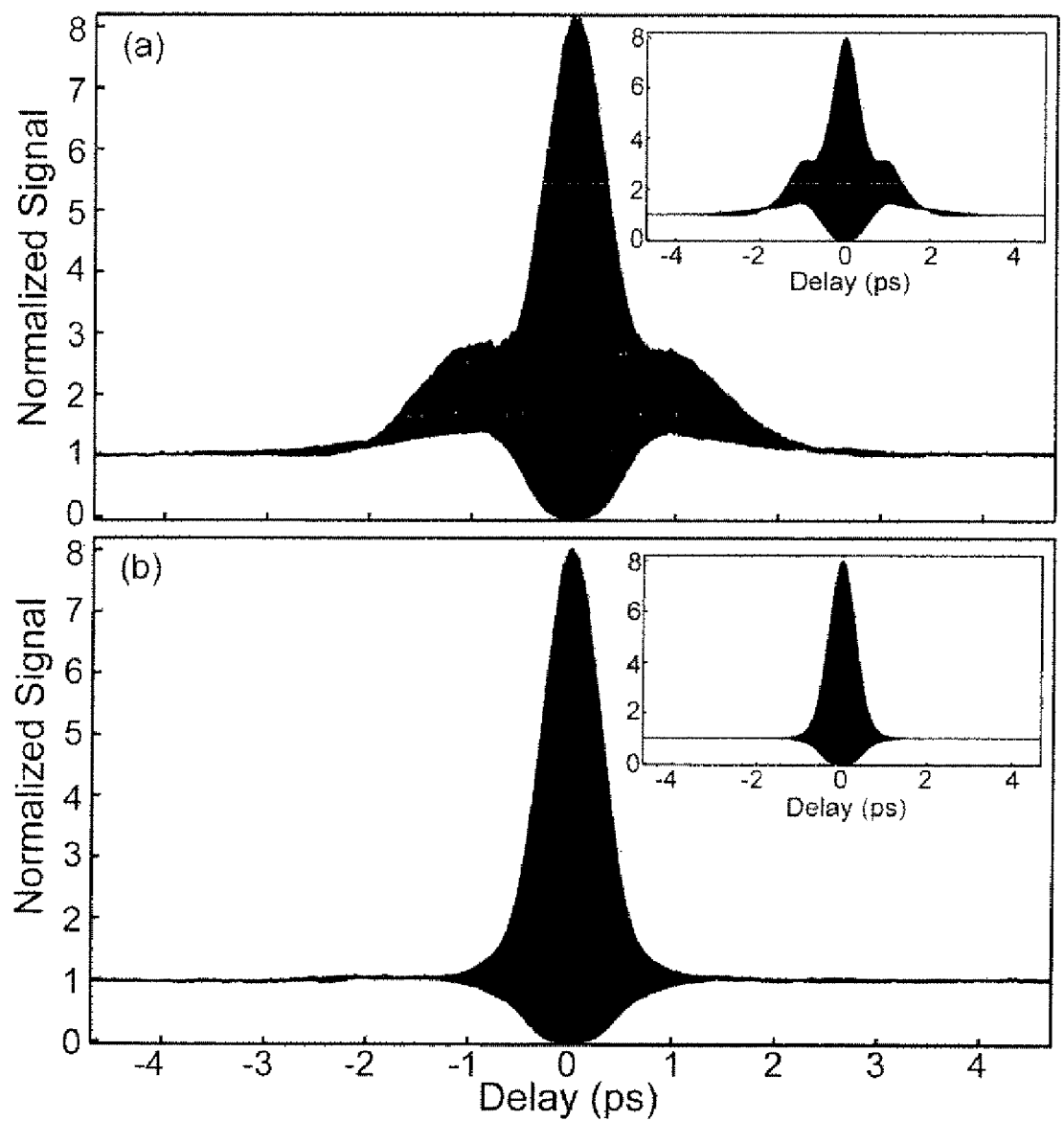
Figs. 4a (PRIOR ART) and 4b

METHODS AND SYSTEMS FOR COMPENSATION OF SELF-PHASE MODULATION IN FIBER-BASED AMPLIFICATION SYSTEMS

CROSS REFERENCE TO RELATED APPLICATIONS

This application claims priority of U.S. provisional patent application No. 60/795,681, Compensation of Sell-Phase Modulation in Fiber-Based Chirped-Pulse Amplification Systems, filed on Apr. 28, 2006, which is incorporated by reference herein.

BACKGROUND OF THE INVENTION

Fiber-based amplifiers have generated great interest recently due to their ability to amplify ultrafast pulses to energies comparable to conventional bulk solid-state systems while offering significant practical advantages, including compactness, reduction of complex components, and freedom from misalignment. The excellent heat dissipation of the fiber gain medium also offers greater long-term pulse stability. However, the smaller beam confinement and larger interaction lengths render them ~$10^6$ times more sensitive to nonlinear effects then bulk solid-state amplifiers. To avoid nonlinear effects, the dominant of which is self-phase modulation (SPM), it is necessary to employ chirped-pulse amplification (CPA) where pulses are stretched before amplification in order to reduce peak power, and compressed afterwards. However, even with the largest practical stretched pulse durations of ~1 ns, power must be scaled back so as to allow no more than 1 radian of nonlinear phase shift in the gain medium to prevent noticeable pulse distortion and broadening.

Compensation of SPM therefore shows great promise in helping fiber-based chirped-pulse amplification (CPA) systems achieve pulses with larger energy. Eliminating SPM can also remove some of the complications employed to avoid nonlinearities, such as the use of large core multimode fibers, photonic crystal fibers and the large amounts of dispersion necessary for stretching. Compensation of SPM in chirped-pulse amplification (CPA) systems has been shown by using the negative nonlinear index ($n_2$) of some materials, using a spatial light modulator (SLM) in a pulse-shaping configuration, and by residual third-order dispersion (TOD). However, the wavelength dependence of semiconductor parameters degrades the quality of compensation for pulses less than ~1 ps, and linear and two-photon absorption limit the thickness of the material and thus the amount of nonlinear phase that can be practically removed. The concerns in using SLM's are cost and complexity of compensation which requires nontrivial free space alignment as well as speed limitations of the SLM which is physically limited to less than ~1 kHz. The use of residual third-order dispersion (TOD) is practical to implement, but only partially compensates SPM at best.

There is a need for improved methods and systems for compensation of self-phase modulation (SPM) in chirped-pulse amplification (CPA) systems.

BRIEF SUMMARY

In one embodiment of the method of these teachings for substantially canceling the nonlinear phase accumulated from self-phase modulation (SPM), the method includes imparting phase, with a phase modulator, on an optical signal, the imparted phase being sufficient to substantially compensate for self phase modulation in a fiber-based amplifier. The optical signal can be at the input, output or an intermediate location in the fiber-based amplifier.

In another embodiment, the method also includes utilizing a signal proportional to optical intensity of the optical signal as a modulating signal for the phase modulator.

In another instance, the method includes selecting the sign and magnitude of the modulating signal according to a predetermined criterion.

One embodiment of the system of these teachings includes a phase modulator and means for providing a signal proportional to optical intensity of an amplifier output as a modulating signal for the phase modulator.

For a better understanding of the present invention, together with other and further needs thereof, reference is made to the accompanying drawings and detailed description and its scope will be pointed out in the appended claims.

BRIEF DESCRIPTION OF THE DRAWINGS

FIG. 2 is a schematic flowchart representation of an embodiment of the method of these teachings;

FIG. 4a is a schematic graphical representation of results obtained from a system not including SPM compensation;

FIG. 4b is a schematic graphical representation of further results obtained from a system including an embodiment of an SPM compensator of these teachings.

DETAILED DESCRIPTION

Figure 1:
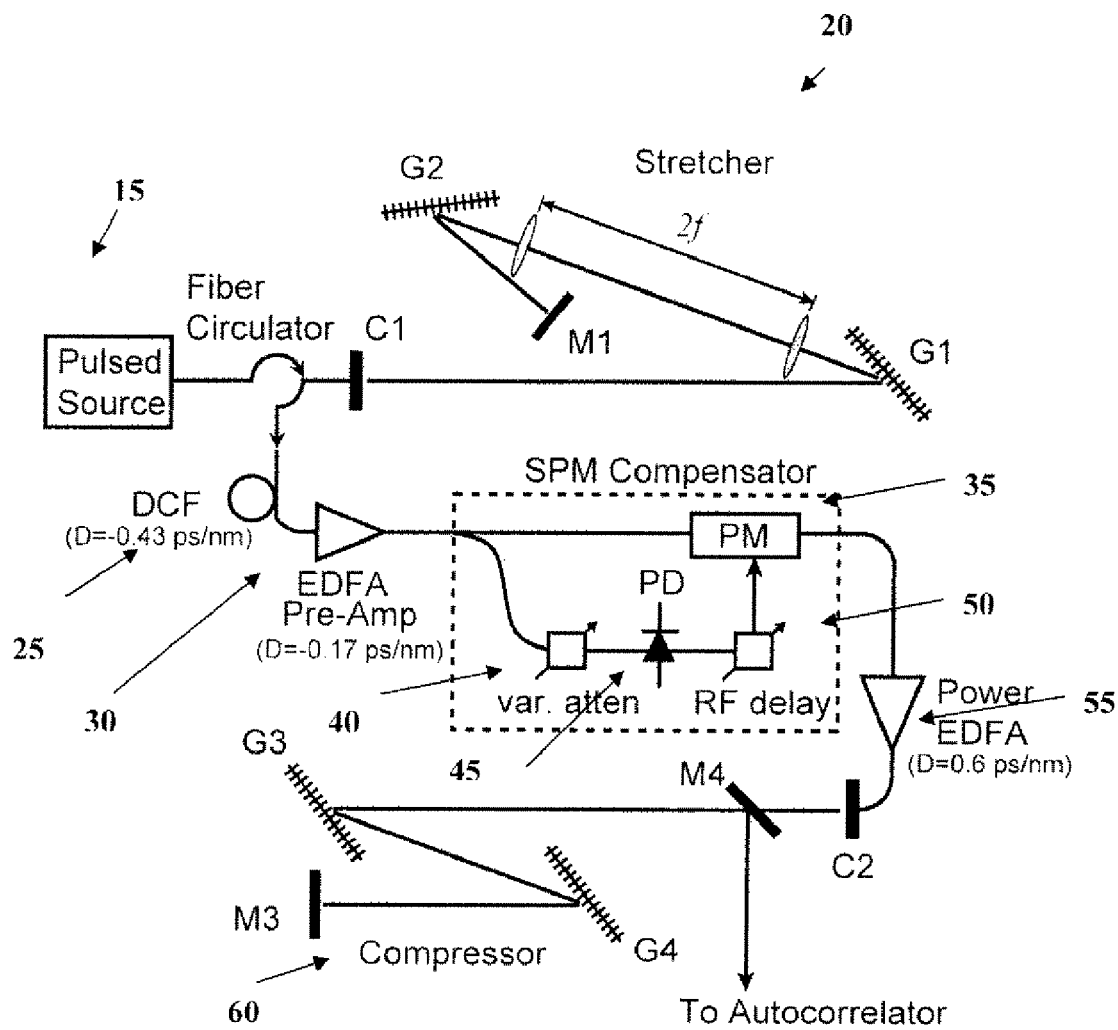
FIG. 1 is a schematic graphical representation of a system including an embodiment of an SPM compensator of these teachings.

In one embodiment, the method of these teachings for compensation of self phase modulation in fiber-based amplifiers includes utilizing a phase modulator to impart a phase on an optical signal, the optical signal being obtained at a predetermined location in a fiber-based amplifier, where the imparted phase is substantially sufficient to compensate for self phase modulation in the fiber-based amplifier. The optical signal can be obtained from the input of the fiber-based amplifier, from the output or an intermediate location. In one instance, a signal proportional to the optical intensity of the optical signal is used as the modulating signal for the phase modulator. In one embodiment, the sign and magnitude of the modulating signal are determined according to a predetermined criterion, for example, proportional to the negative of the intensity of the optical signal.

One embodiment of the system of these teachings includes a phase modulator capable of receiving and modulating an optical signal, the optical signal being obtained at a predetermined location in a fiber-based amplifier and a detector subsystem capable of receiving a portion of the optical signal and of providing a signal proportional to optical intensity of the portion of the optical signal as a modulating signal for the phase modulator.

In one instance, an embodiment of the system of these teachings substantially removes the nonlinear phase due to self-phase modulation (SPM) that a pulse accumulates during amplification in a fiber gain medium, $$\varphi_{NL} = n_2 k \int_0^L |E(z, t)|^2 dz,$$

where $|E(z,t)|^2$ is the temporal profile of the intensity at a given point in the gain-fiber. Because the total dispersion during stretching for a typical chirped-pulse amplification (CPA) system is much larger than the total dispersion in the amplifier, the interaction between nonlinearity and dispersion is substantially negligible. In one instance, the nonlinear phase accumulated from self-phase modulation (SFM) is given by $\phi_{NL}=n_2k|E_f(t)|^2L_{eff}$, where $|E_f(t)|^2$ is the temporal profile of the output intensity from the amplifier and $L_{eff}$ is the effective length determined by the gain profile of the amplifier as a function of z. In an embodiment of the method of these teachings for substantially removing the nonlinear phase due to self-phase modulation (SPM), a phase modulator, such as, but not limited to, a $LiNbO_3$ electro-optic phase modulator, is driven by a modulating signal, such as a voltage, that is proportional to optical intensity of the amplifier output. The phase imparted to optical pulses by the phase modulator can be described by $\phi_{PM}=\pi \cdot V(t)/V_\pi$, where $V_\pi$ is the voltage required to obtain a $\pi$ phase shift. By applying a voltage proportional to the negative of the output intensity of the amplifier, $V(t) \propto -|E_f(t)|^2$, negative $n_2$ can be effectively emulated and the phase modulator can be used to compensate the nonlinear phase. This embodiment of the technique of these teachings differs from using true optical negative $n_2$ since electro-optic modulators have response times on the order of ~10 ps and negative $n_2$ generally has a response <1 ps. However, in the embodiment of the compensation method of these teachings, phase is imposed on pulses stretched to >100 ps. Therefore, the response time of the electro-optic modulator is sufficient.

Figure 3:
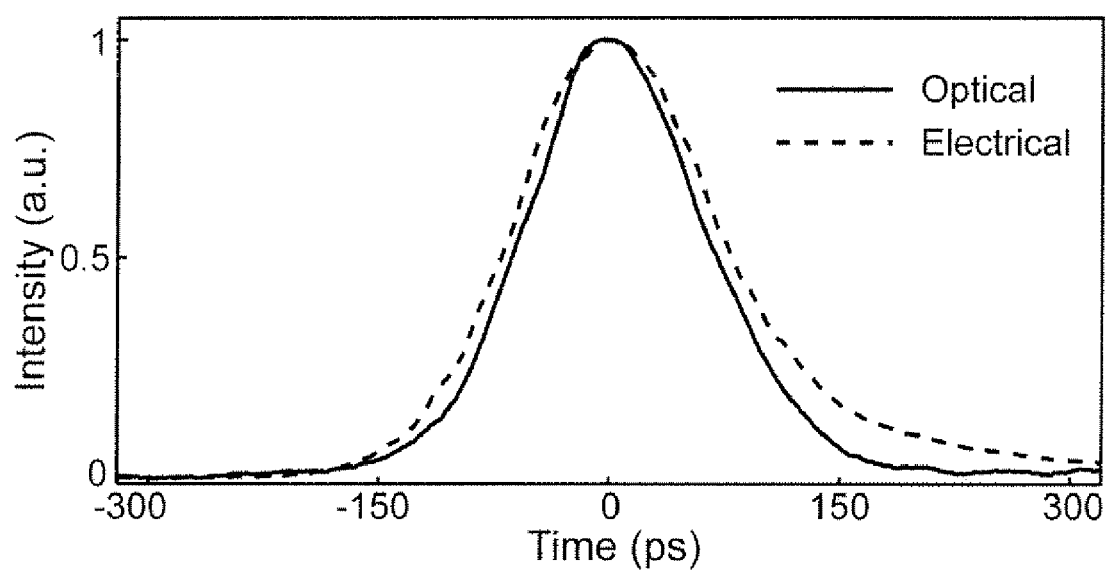
FIG. 3 is a schematic graphical representation of results obtained from a system including an embodiment of an SPM compensator of these teachings.

A fiber based chirped-pulse amplification (CPA) system including an embodiment of the phase compensator of these teachings is shown in FIG. 1. It should be noted that these teachings are not limited to only the embodiment shown in FIG. 1. The pulsed source 15, in the embodiment shown in FIG. 1, consists of a mode-locked fiber laser (for example, IMP; Femtolite B-4-FC) producing 0.08 nJ, 370 fs pulses at a center wavelength of 1556 nm and a repetition rate of 50 MHz. The optical spectrum is approximately $Sech^2$ in shape with a 3-dB bandwidth of 7.0 nm. Pulses are stretched to 136 ps (FIG. 2) by a grating stretcher 20 giving −20.0 ps/nm of total dispersion, in the embodiment shown in FIG. 1. The pulses are then pre-amplified by an erbium doped fiber amplifier (EDFA) 30 to account for some of the loss through the stretcher and following the self-phase modulation (SPM) compensator of these teachings. Five meters of slope-matched dispersion compensating fiber 25 with a total dispersion of −0.43 ps/nm is placed before the pre-amp to compensate dispersion from the power amplifier (0.6 ps/nm) and the pre-amp (−0.17 ps/nm). The dispersion compensating fiber 25 allows matching the grating compressor to the stretcher and avoiding non-negligible effects from higher order dispersion. The embodiment of the self-phase modulation (SPM) compensator of these teachings, which is shown in FIG. 1, includes an $LiNbO_3$ phase modulator 35 driven synchronously by the detected optical input signal. A variable attenuator 40 is used to adjust the power into the 10-GHz high-speed photo-detector 45 (for example, Discovery Semiconductors DSC-R402) in order to adjust the magnitude of the compensation signal, and a variable RF delay 50 is used to synchronize the electronic drive with the optical input. By choosing the correct sign and magnitude of the driving signal, the phase modulator pre-compensates each pulse with the desired amount of "negative SPM." For proper compensation, the detector bandwidth and stretched pulse duration must both be large enough so that the electronic signal into the phase modulator accurately follows the stretched optical signal. The oscilloscope time trace in FIG. 3 shows the comparison between the optical pulse (solid curve) and electrical signal (dashed curve) in the embodiment of the system of these teachings shown in FIG. 1. The small deviation is expected due to the measured 63 ps impulse response of the detector and following RF components. Simulation shows that this deviation has no noticeable effect for pre-compensation in the system of FIG. 1. After SPM pre-compensation, pulses are amplified from 0.02 nJ to 30 nJ by a commercial two-stage erbium doped fiber amplifier (EDFA) 55 (for example, IPG; EAU-1-C) where the pulses simultaneously acquire ~1.0$\pi$ of nonlinear phase from self-phase modulation (SPM). The total length of fiber inside of the amplifier 55 is ~26 m with an output fiber pigtail of ~1.25 m giving a measured total dispersion of 0.6 ps/nm. The nonlinear coefficient of the fiber in the amplifier is close to that of single mode fiber (SMF), $\gamma$~1.2 $W^{-1}km^{-1}$, leading to the expected nonlinear phase shift of ~1.0$\pi$ obtained in measurements of the system of FIG. 1. After amplification, pulses are compressed by a grating compressor 60 providing 20 ps/nm of dispersion and then measured by an interferometric second-order autocorrelator (not shown).

A flowchart representation of an embodiment of the method of these teachings is shown in FIG. 2. Referring to FIG. 2, in the embodiment of the method of these teachings shown therein, a signal proportional to optical intensity of an optical signal is used as a modulating signal for a phase modulator (step 65, FIG. 2). A phase, obtained from the phase modulator in which the above-described signal is used as a modulating signal, is imparted on the optical signal (step 70, FIG. 2), the imparted phase being sufficient to substantially compensate for self phase modulation in a fiber-based amplifier. The optical signal can be obtained from the output of the fiber-based amplifier, the input to the fiber-based amplifier, or an intermediate location along the fiber-based amplifier.

In order to better illustrate the methods and systems of these teachings, the following exemplary results are provided. To demonstrate the concept of these teachings, auto-correlation traces were measured with and without SPM compensation for the highest power obtainable from the amplifier and therefore the largest amount of self-phase modulation (SPM). This corresponded to 1.5 W and 1.0$\pi$ respectively. For both cases, the grating stretcher and compressor were left in a matched configuration in which the compressor length is optimized by maximizing the two-photon photocurrent of a silicon diode for low power out of the power-amplifier (20 mW) and therefore negligible nonlinearity. FIG. 4(*a*) shows the high-power trace without compensation and 3(*b*) shows the trace for 1.0$\pi$ compensation (~5.0 V peak-to-peak signal into the phase modulator). Calculated results from simulation are shown in the insets of each figure. The significant reduction in pulse broadening and distortion shown in FIG. 3(*b*) demonstrates the effectiveness of the compensation technique of these teachings. Furthermore, the match between simulated and measured autocorrelation traces demonstrates the accuracy with which the method and systems of these teachings can remove self-phase modulation (SPM). Taking into account the deconvolution factor, the final compensated intensity pulse width corresponds to 418 fs which is only 13% beyond the transform limit of 370 fs. The transform limit is not entirely recovered due to a small amount of nonlinearity in the 2 m of fiber between the source and the stretcher, ~0.5 radians of self-phase modulation (SPM).

Figure 5:
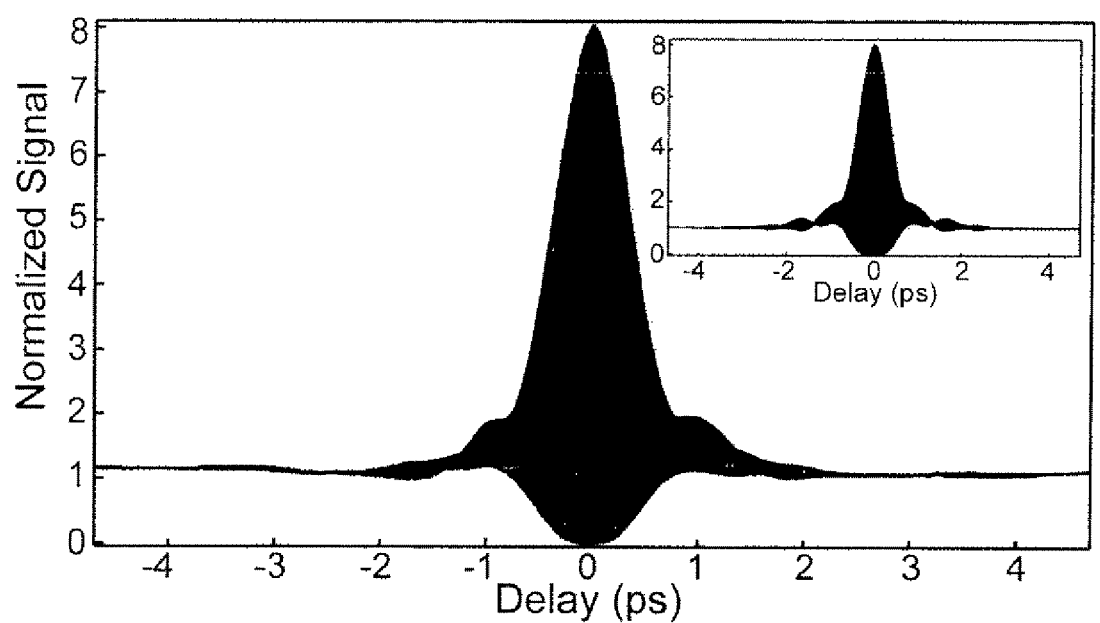
FIG. 5 is a schematic graphical representation of results obtained from a system including a conventional SPM compensator.

In order to further illustrate the methods and systems of these teachings, the configuration of a matched stretcher-compressor with SPM compensation of these teachings is compared to the typical conventional configuration in which a deliberately mismatched grating compressor providing anomalous dispersion is used to mitigate effects of SPM. FIG. 5 shows the autocorrelation trace for the conventional system with $1.0\pi$ radians of SPM and an optimally mismatched grating compressor (by decreasing the grating distance of the compressor until the two-photon current is maximized.). Calculated results from simulation are shown in the inset. Not only is the pulse width for this configuration 23% larger than that with SPM compensation utilizing the methods of these teachings and in a matched stretcher-compressor system (FIG. 4(b)), but there also resides a significant amount of energy in incompressible side lobes. Using SPM compensation according to the methods of these teachings in a matched stretcher-compressor, however, can substantially return pulses to the transform limit even in view of increasing nonlinearity.

Simulations show that for an amplifier dispersion of 0.6 ps/nm there is no noticeable distortion in the temporal profile of the pulse intensity for compensating up to $10\pi$ radians of SPM utilizing the methods and systems of these teachings. Decreasing the amount of dispersion in the power amplifier will make SPM compensation utilizing the methods and systems of these teachings more robust allowing for compensation of even larger nonlinear phase shifts.

Although the invention has been described with respect to various embodiments, it should be realized that these teachings are also capable of a wide variety of further and other embodiments within the spirit and scope of the appended claims.

What is claimed is:

1. A method for pre-compensation of self phase modulation in fiber-based amplifiers in order to achieve amplified pulses with larger power, the method comprising the step of:
   receiving, at a detector system, at least a portion of an optical signal;
   providing, from said detector system, a signal proportional to optical intensity of said at least a portion of said optical signal as a modulating signal for a phase modulator;
   imparting phase, with said phase modulator, on said optical signal, before amplification by a fiber-based amplifier, the imparted phase being sufficient to substantially compensate for self phase modulation in the fiber-based amplifier; and
   pre-compensating self phase modulation by providing said optical signal as an input to the fiber-based amplifier in order to achieve amplified pulses with larger power; larger power being power that results in more than 1 radian of nonlinear phase shift before compensation of self phase modulation.

2. The method of claim 1 wherein the step of imparting phase on an optical signals comprises the step of utilizing a signal proportional to optical intensity of said optical signal as a modulating signal for the phase modulator.

3. The method of claim 2 wherein the step of utilizing the signal proportional to optical intensity comprises the step of selecting sign and magnitude of the modulating signal according to a predetermined criterion.

4. The method of claim 1 wherein said pre-compensation also substantially removes some of the complications employed to avoid nonlinearities.

5. A system comprising:
   a phase modulator capable of receiving and modulating an optical signal; said optical signal being an input to a fiber-based amplifier; and
   a detector subsystem capable of receiving at least a portion of said optical signal and of providing a signal proportional to optical intensity of said at least a portion of said optical signal as a modulating signal for said phase modulator.

6. The system of claim 5 further comprising:
   a variable output component capable of receiving at least another portion of said optical signal and of providing said at least another portion of said optical signal to the detector subsystem.

7. The system of claim 5 further comprising:
   a delay component capable of receiving said signal proportional to optical intensity and of providing a delayed signal proportional to optical intensity as a modulating signal for said phase modulator.

8. The system of claim 5 wherein said detector subsystem comprises a photodetector.

9. The system of claim 5 wherein said phase modulator comprises an electro-optic phase modulator.

* * * * *